April 9, 1935.  F. S. MARCELLUS  1,997,468
HUMIDITY RESPONSIVE DEVICE
Filed March 31, 1932
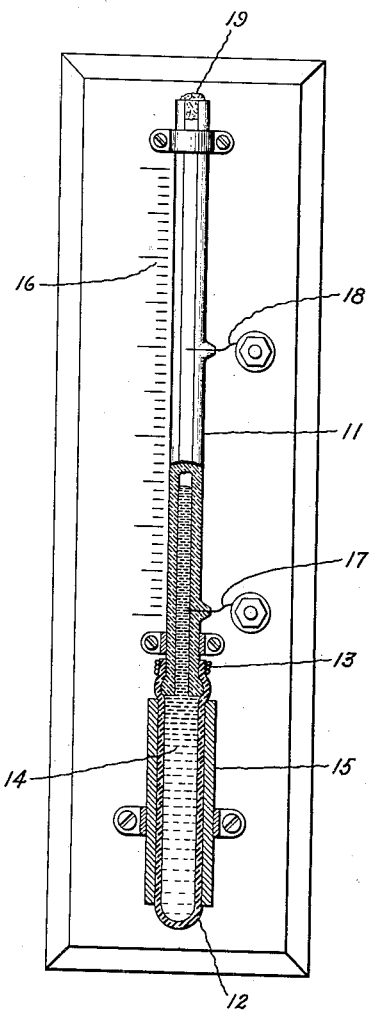
Inventor:
Fredrick S. Marcellus,
by Charles E. Tullar
His Attorney.

Patented Apr. 9, 1935

1,997,468

UNITED STATES PATENT OFFICE 1,997,468

HUMIDITY RESPONSIVE DEVICE

Fredrick S. Marcellus, Scotia, N. Y., assignor to General Electric Company, a corporation of New York Application March 31, 1932, Serial No. 602,183

3 Claims. (Cl. 297—1)

My invention relates to humidity responsive devices and has for its principal object the provision of a simple, easily used device for indicating or controlling humidity, which may be readily produced at small cost and which is durable and does not require careful handling. Other and further objects and advantages will become apparent as the description proceeds.

In accordance with my invention in its preferred form, I provide a tube having the opening in one end closed by attaching thereto a sack of flexible material which is relatively unaffected by variations in humidity. A quantity of liquid fills the sack and partially fills the tube. The sack is closely surrounded by a body composed of a material having the property of expanding and contracting with variations in moisture content. Consequently, as the relative humidity of the surrounding atmosphere changes, the moisture content of this surrounding body changes and the flexible tube is compressed or released, thereby forcing a greater or less amount of liquid into the tube. Suitable means responsive to the quantity of liquid in the tube are provided. For example, in connection with a transparent tube, a scale may be provided calibrated in any suitable units such as per cent relative humidity or if the device is desired to transmit indications to a distance or to control other apparatus in response to variations in humidity, I may employ a conducting fluid and provide contacts at various points within the tube so that electrical circuits may be closed or opened in response to variations in the quantity of liquid contained in the tube.

The arrangement is a modification of that disclosed in my copending application, Serial No. 602,182, filed March 31, 1932, and such features as come within the scope of said application are claimed therein. However, the features of my invention falling within the scope of the present application and which I believe to be novel and patentable will be pointed out in the claims appended hereto. My invention itself, however, may be more clearly understood by referring to the following description taken in connection with the accompanying drawing.

Referring now more in detail to the drawing, I provide a tube 11 composed of any suitable substance such as glass and a sack 12 composed of any suitable flexible material substantially unaffected by variations in humidity such as soft rubber. The sack 12 is attached to the lower end of the tube 11, preferably by means of cement or other suitable adhesive, and if desired, the permanency of the union is assured by binding the upper portion of the sack to the tube by means of suitable binding material 13. A liquid 14 fills the sack 12 and partially fills the tube 11.

In order to make the device responsive to variations in humidity a sleeve 15 is slipped around the sack 12. The sleeve 15 may be composed of any suitable material which is expansible and contractible with variations in moisture content. Although I am not restricted to any particular material I find satisfactory results may be obtained by utilizing a hollow cylinder of wood, for example, pine, with the grain running substantially in the direction of the axis of the sleeve or cylinder 15. In case wood or a similar material is used for the sleeve 15, a decrease in relative humidity will cause a drying out of the material and a consequent contraction, decreasing the internal as well as the external diameter of the sleeve. This in time will compress the sack 12 and drive the liquid 14 to a higher level in the tube 11. Likewise when the relative humidity rises the diameter of the sleeve 15 will increase, permitting the sack 12 to expand and the level of the liquid 14 to fall in the tube 11. Although I prefer to utilize a cylindrical sleeve 15 and an elongated sack 12 in order to increase the amount of liquid displaced by a given relative variation in dimension of the sleeve 15, it will be understood that I am not limited to the exact proportions or shapes of the parts illustrated in the drawing.

If desired a plug 19 of cotton or any other suitable material may be employed to prevent spillage of the liquid 14 when the device is moved or handled. Preferably the plug 19 is so constructed that air may pass through and the inner portion of the tube may remain at atmospheric pressure.

The arrangement here illustrated has the advantage that a relatively secure and lasting union between the sack or bulb 12 and the tube 11 may be obtained easily at small cost. It will be apparent that in my arrangement, since the material from which the sleeve 15 is produced need not be impervious to the liquid 14, the accuracy and reliability of my device would not be impaired by minor imperfections in the sleeve 15 such as cracks or weak spots which would necessitate the rejection of the sleeve 15 if it were intended to hold the liquid 14. For this reason the sleeve 15 may be produced more easily, quickly, and cheaply than would otherwise be the case.

Indications of relative humidity may be obtained by reading the height of the liquid 14 in tube 11 by means of a scale 16. The apparatus may also be utilized to control electrical circuits in response to variations in humidity by providing electrical contacts 17 and 18 at any desired points in the tube 11. In this case the liquid 14 comprises a conducting liquid, preferably one having a relatively high conductivity such as mercury.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is,—

1. A humidity responsive device comprising a tube, an elongated sack attached to one end of said tube, closing the opening therein and composed of a flexible material relatively unaffected by variations in humidity, a liquid filling said sack and partially filling said tube, a body surrounding said sack and composed of a material which expands and contracts with variations in moisture content thereby variably compressing said sack and causing the amount of liquid contained in said tube to vary with variations in humidity.

2. A humidity responsive device comprising a tube, a sack attached to one end of said tube and closing the opening therein and composed of a flexible material relatively unaffected by variations in humidity, a liquid filling said sack and partially filling said tube, a body surrounding said sack and composed of a fibrous material expansible and contractible with variations in moisture content thereby variably compressing said sack and causing the amount of liquid in said tube to vary with variations in humidity.

3. A humidity responsive device comprising a tube, an elongated sack attached to one end of said tube and closing the opening therein and composed of a flexible material relatively unaffected by variations in humidity, a liquid filling said sack and partially filling said tube, a hollow wooden body having a substantially cylindrical bore, said sack occupying said bore, thereby being variably compressed by the contraction and expansion of said wooden body and causing the amount of liquid in said tube to vary with variations in humidity.

FREDRICK S. MARCELLUS.